Feb. 6, 1940.　　　　　G. H. COX　　　　　2,189,169
VEHICLE RADIATOR GRILLE GUARD
Filed Aug. 16, 1939
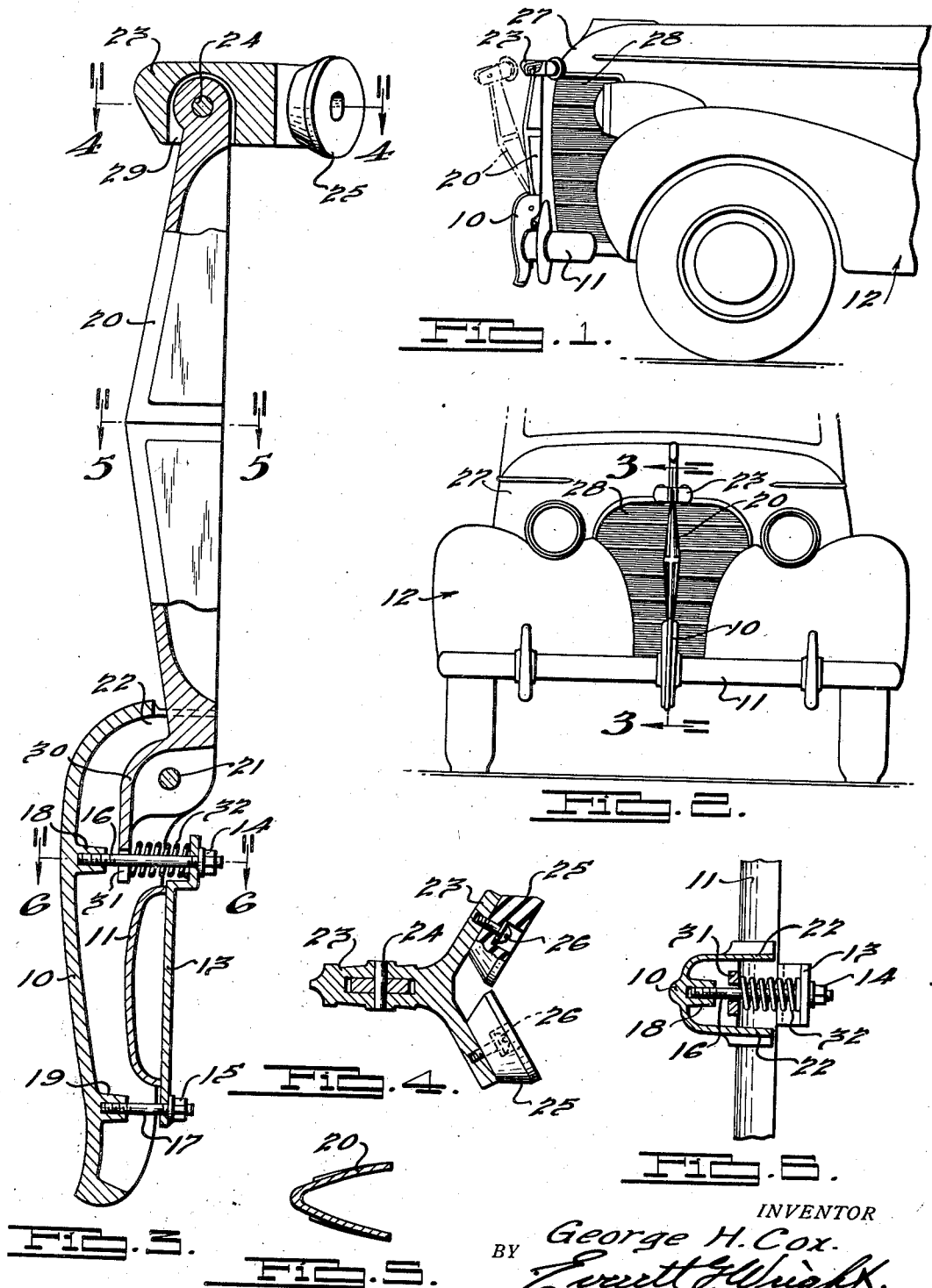
INVENTOR
George H. Cox.
BY Everett G. Wright
ATTORNEY Patented Feb. 6, 1940

2,189,169

UNITED STATES PATENT OFFICE 2,189,169

VEHICLE RADIATOR GRILLE GUARD

George H. Cox, Detroit, Mich.

Application August 16, 1939, Serial No. 290,514

8 Claims. (Cl. 293—55)

This invention relates to improvements in guards for automobile radiator grilles and the like.

In modern motor vehicles the radiator thereof has an ornamental grille disposed thereover which extends a substantial distance in front of the radiator and is frequently damaged when the vehicle runs into or is hit by another machine. The grilles generally employed are stamped, die cast or otherwise formed of light metal and either nickel-plated or chromium-plated and, because of their light construction, they may be easily damaged. Once a grille is dented by a collision or the like the repair expense often is so great that it is necessary to completely replace the damaged grille by a new one. At the present time, a short vertical grille guard member is employed which is secured to the bumper of the motor vehicle at the center thereof and is disposed in spaced relationship with respect to the front of the grille. The said short vertical grille guard members generally employed cantilever a short distance above the bumper are not always effective in protecting the radiator grille of a motor vehicle inasmuch as they are easily bent back against the grille and, in most instances, they do not extend up high enough to protect the central or upper portion of the grille.

The majority of the more recent motor vehicles are provided with alligator-type hoods which raise on a hinge at the cowl. The top of the radiator grille is usually fixed to a frame or the like at the joint between the front of the hood and the radiator grille thus making rather rigid construction at the front of the hood. The front of the hood generally being adapted to latch closed against the said frame or the like onto which the upper end of the radiator grille is fixed.

With the foregoing in view, one object of the invention is to provide a grille guard which will protect the radiator grille of a motor vehicle the full heighth thereof in the event a motor vehicle runs into an obstruction or has another vehicle run or back into it.

Another object of the invention is to provide a radiator grille guard which will effectively protect the grille from damage and which will, at the same time, present a neat appearance that will not detract from the general attractiveness of the motor vehicle upon which it may be mounted.

Another object of the invention is to provide a radiator grille guard which may be secured at its bottom to the bumper of a motor vehicle in such a manner as to bear at its top against the top of the grille or the front of the hood of a motor vehicle at the grille or hood supporting member whereby any stresses or strains received by the grille guard become transferred directly to the bumper and the front of the hood of the motor vehicle at which point the automobile manufacturers generally provide rather heavy hood and grille supporting members.

Another object of the invention is to provide a radiator grille guard which is pivotally supported on the bumper of a motor vehicle and which normally bears resiliently against the forward end of the hood or grille support of an automobile and which is adapted to be manually released from contact against the hood of the motor vehicle whereby to permit the raising of the said hood when desired or required.

Another object of the invention is to provide a radiator grille guard supported at its lower end on the bumper of a motor vehicle and at its upper end against the top of the radiator grille or the front of the hood of the said motor vehicle at the grille or hood supporting member which transfers only a portion of shocks thereagainst to the top of the grille or front of the hood of the motor vehicle and which permits the bumper to receive shocks and deflect without transferring the same to the top of the grille or the front of the hood of the said motor vehicle.

Other objects of the invention will become apparent by reference to the following detailed description taken in connection with the accompanying drawing, in which:

Fig. 1 is a fragmentary side elevational view of a motor vehicle equipped with a radiator grille guard embodying the invention.

Fig. 2 is a front elevational view of the construction disclosed in Fig. 1.

Fig. 3 is an enlarged detailed sectional view of the grille guard taken on the line 3—3 of Fig. 2 showing means for securing the grille guard to the bumper of the motor vehicle.

Fig. 4 is a horizontal sectional view taken on the line 4—4 of Fig. 3 showing the limited pivotal mounting of the ornamental bearing block employed at the top of the grille guard bar.

Fig. 5 is a horizontal sectional view taken on the line 5—5 of Fig. 3 showing a preferred shape of the grille guard bar.

Fig. 6 is a horizontal sectional view taken on the line 6—6 of Fig. 3 showing the preferred pivotal mounting means employed to support the grille guard bar and maintain the pivoted bearing block at the upper end of the grille guard normally and resiliently in contact against the hood or the like of a motor vehicle.

Referring now to the drawing wherein like numerals refer to like and corresponding parts throughout the several views, the illustrative embodiment of the grille guard disclosed therein comprises a short fixed vertically disposed guard 10 secured to the transverse center of the bumper 11 of a motor vehicle 12 by means of a keeper plate 13 and nuts 14 and 15 threaded on upper and lower securing studs 16 and 17 which extend through the said keeper plate 13 and are threaded into bosses 18 and 19 preferably cast in the rear of the said fixed guard 10. A normally vertically disposed grille guard bar 20 is preferably pivotally supported at its lower end on a transverse pivot pin 21 disposed through the upper rearwardly disposed bifurcated end 22 of the said short fixed guard 10. The said grille guard bar 20 may be shaped and ornamented as desired, for example, as indicated in Figs. 1, 2 and 5.

The upper end of the said grille guard bar 20 has a suitable ornamental bearing block 23 pivoted thereon by means of a pivot pin 24 extending transversely through the upper end of the said grille guard bar 20. The rearward end of the said bearing block 23 is preferably formed Y-shaped and has suitable resilient shock absorbing pads 25 mounted thereon by such means as the studs 26. Any suitable resilient pad means 25 may be employed. For example, the separate resilient pads 25 as best shown in Figs. 3 and 4 may have a single resilient generally V-shaped pad substituted therefor, however, in any event, the rearward end of the said bearing block 23 and the resilient shock absorbing means 25 carried thereby should precisely conform to the configuration of the hood 27 of the said motor vehicle 12 or the upper portion of the grille 28 of the said motor vehicle 12, whichever is selected for the bearing block 23 to bear against. Obviously, if the upper end of the grille 28 is more firmly supported from behind than the front end of the hood 27, the bearing block 23 and its resilient shock absorbing means 25 would be constructed to bear thereagainst.

It will be particularly noted that the cavity 29 formed in the bearing block 23 to accommodate the upper end of the said grille guard bar 20 is such as will permit only a limited pivotal movement of the said bearing block 23 with respect to the guard bar 20 and vice versa. This is for the purpose of maintaining the said bearing block 23 disposed substantially normal to the said guard bar 20 and yet permitting the lower end of the guard bar 20 to move freely with the bumper 11 of the motor vehicle 12 without a corresponding movement of the bearing block 23 which prevents any of the shock taken by the bumper 11 of the motor vehicle 12 from being transferred through the guard bar 20, the bearing block 23 and its resilient shock absorbing means 25 to the hood 27 or the upper end of the grille 28 of the said motor vehicle 12.

However, any shocks that may be received by the grille guard bar 20 are proportionately transferred to the bumper 11 and the hood 27 or the upper end of the grille 28 of the motor vehicle 12 through the pivot pins 21 and 24; the lower the force of a blow applied to the grille guard bar 20 the less the shock transferred to the hood 27 or the upper end of the grille 28 of the motor vehicle 12 through the said bearing block 23 and its resilient shock absorbing means 25. Inasmuch as the majority of the blows received by the grille guard bar 20 are received below the vertical center thereof, very few shocks are carried up to the hood 27 or the upper end of the grille 28 of the motor vehicle.

In order to normally maintain the grille guard bar 20 in a vertical position with the bearing block 23 and its resilient shock absorbing means 25 positioned against the hood 27 or upper end of the grille 28 of the motor vehicle on which the novel grille guard is mounted, the lower end of the said grille guard bar 20 is provided with a preferably integral transversely disposed tongue 30 depending below the transverse pivot pin 21 which supports the said grille guard bar 20 on the upper bifurcated end 22 of the short fixed guard 10. The said depending tongue 30 is preferably provided with vertically bifurcated end 31 in the central lower portion thereof to permit the said tongue to straddle the upper stud 16 used in securing the fixed guard 10 to the bumper 11 as best shown in Figs. 3 and 6. A heavy spring 32 telescoped over the stud 16 positioned between the upper end of the keeper plate 13 and the vertically bifurcated end 31 of the depending tongue 30 of the grille guard bar 20 causes the said grille guard bar 20 to pivot around the said pivot pin 21 and resiliently maintain itself in a vertical position with the bearing block 23 thereof and its resilient shock absorbing means 25 positioned against the hood 27 or the upper end of the grille 28 of the motor vehicle 12.

The grille guard bar 20 may be manually pivoted as indicated by the dot and dash lines in Fig. 1 when the hood 27 of the motor vehicle 12 is being opened or closed, thus no interference is had by the novel grille guard herein disclosed with the operation of the alligator hood of a motor vehicle.

Although but one embodiment of the invention has been disclosed and described, it is obvious that many changes and modifications of the size, shape, arrangement and detail of the various elements of the invention may be made without departing from the spirit thereof, and it is not intended to limit the scope of the invention other than by the terms of the appended claims.

I claim:

1. A motor vehicle grille guard comprising a grille guard bar disposed generally vertical and in spaced relationship in front of a motor vehicle grille, means for pivotally supporting said grille guard bar adjacent the lower portion of said grille, shock absorbing bearing means on the upper end of said grille guard bar, and spring means adapted to engage said grille guard bar and urge the said shock absorbing bearing means on the upper end thereof into yieldable contact against the motor vehicle whereby to normally maintain the said grille guard bar in a vertical position.

2. A motor vehicle grille guard comprising a grille guard bar disposed generally vertical and in spaced relationship in front of a motor vehicle grille, means for pivotally supporting said grille guard bar adjacent the lower portion of said grille, shock absorbing bearing means pivoted on the upper end of said grille guard bar, and spring means adapted to engage said grille guard bar and urge the said shock absorbing bearing means on the upper end thereof into yieldable contact against the motor vehicle whereby to normally maintain the said grille guard bar in a vertical position.

3. A motor vehicle grille guard comprising a fixed guard secured to the bumper of the motor vehicle, a grille guard bar pivoted to said fixed guard on an axis transverse with respect to said vehicle extending generally vertically thereabove to substantially the full height of the vehicle grille, shock absorbing bearing means secured on the upper end of the said grille guard bar, and spring means adapted to engage said grille guard bar and yieldably maintain the same pivoted to its normal vertical position with the said shock absorbing bearing means at the upper end thereof disposed in contact against the motor vehicle.

4. A motor vehicle grille guard comprising a fixed guard secured to the bumper of the motor vehicle, a grille guard bar pivoted to said fixed guard on an axis transverse with respect to said vehicle extending generally vertically thereabove to substantially the full height of the vehicle grille, shock absorbing bearing means pivotally secured on the upper end of the said grille guard bar on an axis transverse with respect to said vehicle, and spring means adapted to engage said grille guard bar and yieldably maintain the same pivoted to its normal vertical position with the said shock absorbing bearing means pivoted on the upper end thereof disposed in contact against the motor vehicle.

5. A motor vehicle grille guard comprising a fixed guard including means for securing the same to the bumper of a motor vehicle, the said fixed guard being bifurcated at its upper end normal to and just above said bumper, a pivot pin disposed parallel to said bumper fixed across the bifurcated end of said fixed guard, a generally vertically disposed movable grille guard bar pivoted on said pivot pin and extending thereabove substantially the height of the said vehicle grille, shock absorbing bearing means secured on the upper end of the said grille guard bar, and spring means for yieldably maintaining the said grille guard bar pivoted to its normal vertical position with the shock absorbing bearing means thereof in contact against the motor vehicle.

6. A motor vehicle grille guard comprising a fixed guard including means for securing the same to the bumper of a motor vehicle, the said fixed guard being bifurcated at its upper end normal to and just above said bumper, a pivot pin disposed parallel to said bumper fixed across the bifurcated end of said fixed guard, a generally vertically disposed movable grille guard bar pivoted on said pivot pin and extending thereabove substantially the height of the said vehicle grille, shock absorbing bearing means secured on the upper end of the said grille guard bar, a tongue on said grille guard bar depending below its supporting pivot, and spring means engaging said depending tongue adapted to urge the said grille guard bar yieldably into its normal vertical position with the shock absorbing bearing means thereof in contact against said motor vehicle.

7. A motor vehicle grille guard comprising a fixed guard including means for securing the same to the bumper of a motor vehicle, the said fixed guard being bifurcated at its upper end normal to and just above said bumper, a pivot pin disposed parallel to said bumper fixed across the bifurcated end of said fixed guard, a generally vertically disposed movable grille guard bar pivoted on said pivot pin and extending thereabove substantially the height of the said vehicle grille, generally horizontally disposed shock absorbing bearing means pivotally secured on the upper end of said grille guard bar adapted to admit of but a limited pivotal movement with respect to said grille guard bar about an axis parallel to the vehicle bumper, and spring means for yieldably maintaining the said grille guard bar pivoted to its normal vertical position with the shock absorbing bearing means thereof in contact against the motor vehicle.

8. A motor vehicle grille guard comprising a fixed guard including means for securing the same to the bumper of a motor vehicle, the said fixed guard being bifurcated at its upper end normal to and just above said bumper, a pivot pin disposed parallel to said bumper fixed across the bifurcated end of said fixed guard, a generally vertically disposed movable grille guard bar pivoted on said pivot pin and extending thereabove substantially the height of the said vehicle grille, generally horizontally disposed shock absorbing bearing means pivotally secured on the upper end of said grille guard bar adapted to admit of but a limited pivotal movement with respect to said grille guard bar about an axis parallel to the vehicle bumper, a tongue on said grille guard bar depending below its supporting pivot, and spring means engaging said depending tongue adapted to urge the said grille guard bar yieldably into its normal vertical position with the shock absorbing bearing means thereof in contact against said motor vehicle.

GEORGE H. COX.